A. H. Hook.
Perforating Paper.

Nº 44,190.  Patented Sept. 13, 1864.

Witnesses.

Inventor.

Albert H. Hook

UNITED STATES PATENT OFFICE.

ALBERT H. HOOK, OF NEW YORK, N. Y.

IMPLEMENT FOR PERFORATING AND SEVERING PAPER.

Specification forming part of Letters Patent No. 44,190, dated September 13, 1864.

*To all whom it may concern:*

Be it known that I, ALBERT H. HOOK, of the city, county, and State of New York, have invented a new and useful Implement for Perforating or Severing Paper, which I herein describe and ascertain as follows, referring to the accompanying drawings, in which—

Figure 1:
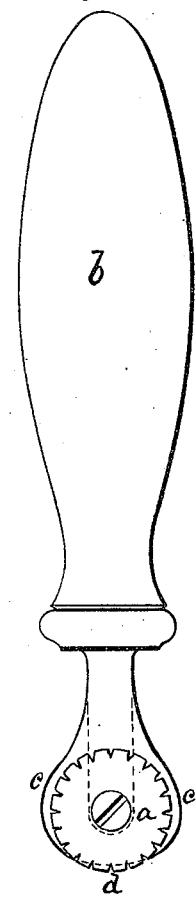
Figure 2:

Figure 1 is a front view. Fig. 2 is a section through the cutter.

Heretofore there has been no hand-implement for perforating and severing paper—such as checks, bills, &c.—that could be conveniently used in counting-houses or by stationers, the only method employed being the expensive one of perforating by machinery, as in postage-stamps and the like.

My implement to supply this want is constructed as follows: The perforator or cutter *a* is a circular wheel or roller, the circumference of which is sharpened so as to cut through paper, &c., over which it is rolled. This perforator may have its edge notched, as shown in the drawings, or its edge may be other than a straight line, to suit the fancy or purpose of the maker.

The cutter is pivoted at its center to the shank of a handle, *b*, which is to be held in the hand by which it is operated.

To protect the perforator *a* from injury or accident I use a shield, *c*, which is a stationary plate affixed to the handle that projects beyond the edge thereof, so as to protect the edge. This shield may, if desired, entirely envelop the perforating-cutter *a*, except at one point where the cutter protrudes, as at *d*, which may be at any place relative to the handle that is found most convenient. The shield will guard the edge of the cutter and will prevent its cutting a straight edge if the implement is used with one.

I am aware that rotary shears have been heretofore used. Rollers with sharp radiating points have also been used for piercing holes in materials for sewing and other purposes, and similar rollers have been used to form a row of dots on paper without piercing, but it will be seen that they are inapplicable to the uses for which this implement is intended.

Having thus fully described my new implement for perforating and severing paper, what I claim therein, and for which I desire to secure Letters Patent, is—

1. The circular cutter-implement composed of a cutter or perforator, *a*, and handle *b*, as and for the purposes set forth.

2. In combination therewith, the shield *c*, as herein specified.

ALBERT H. HOOK.

Witnesses:
J. J. GREENOUGH,
THOMAS SMITH.